United States Patent
Watson (10) Patent No.: US 10,360,371 B1
(45) Date of Patent: *Jul. 23, 2019

(54) SYSTEMS AND METHODS FOR PROTECTING AUTOMATED EXECUTION ENVIRONMENTS AGAINST ENUMERATION ATTACKS

(71) Applicant: Symantec Corporation, Mountain View, CA (US)

(72) Inventor: Andrew Watson, Gloucestershire (GB)

(73) Assignee: Symantec Corporation, Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/569,101

(22) Filed: Dec. 12, 2014

(51) Int. Cl.
*G06F 21/50* (2013.01)

(52) U.S. Cl.
CPC .................................. *G06F 21/50* (2013.01)

(58) Field of Classification Search
CPC ......... G06F 21/125; G06F 21/14; G06F 21/53
USPC ................................................ 726/1, 23, 26
See application file for complete search history.

(56) References Cited

U.S. PATENT DOCUMENTS

| | | | |
|---|---|---|---|
| 9,223,972 B1 | 12/2015 | Vincent et al. | |
| 9,413,774 B1* | 8/2016 | Liu | ...................... H04L 63/1416 |
| 9,692,773 B1 | 6/2017 | Watson et al. | |
| 2004/0205419 A1 | 10/2004 | Liang et al. | |
| 2008/0016339 A1* | 1/2008 | Shukla | ...................... G06F 21/53 713/164 |
| 2009/0094175 A1* | 4/2009 | Provos | ................... G06F 21/564 706/12 |
| 2011/0154431 A1* | 6/2011 | Walsh | ...................... G06F 21/53 726/1 |
| 2012/0079596 A1 | 3/2012 | Thomas et al. | |
| 2013/0312099 A1 | 11/2013 | Edwards et al. | |
| 2014/0317745 A1 | 10/2014 | Kolbitsch et al. | |

(Continued)

OTHER PUBLICATIONS

Sikorski, Michael, "Training Practical Malware Analysis: Rapid Introduction", http://2014.brucon.org/index.php/Training_Practical_Malware_Analysis:_Rapid_Introduction.html, as accesssed Oct. 15, 2014, BruCON 2014, (Sep. 2014).

(Continued)

*Primary Examiner* — Ashokkumar B Patel
*Assistant Examiner* — William B Jones
(74) *Attorney, Agent, or Firm* — FisherBroyles, LLP (57) ABSTRACT

The disclosed computer-implemented method for protecting automated execution environments against enumeration attacks may include (1) monitoring a file that is undergoing a malware analysis in an automated execution environment, (2) while monitoring the file, detecting one or more behaviors exhibited by the file during the malware analysis in the automated execution environment, (3) determining, based at least in part on the behaviors exhibited by the file, that the file is attempting to discover one or more resources used in connection with the malware analysis, and then in response to determining that the file is attempting to discover the resources used in connection with the malware analysis, (4) terminating the malware analysis in an effort to undermine the file's attempt to discover the resources used in connection with the malware analysis. Various other methods, systems, and computer-readable media are also disclosed.

16 Claims, 5 Drawing Sheets

(56) References Cited

U.S. PATENT DOCUMENTS

| | | | | |
|---|---|---|---|---|
| 2015/0074810 A1* | 3/2015 | Saher | ........... | G06F 16/951 726/23 |
| 2015/0163242 A1* | 6/2015 | Laidlaw | ........... | G06F 21/552 726/22 |

OTHER PUBLICATIONS

Andrew Watson, et al; Systems and Methods for Identifying Detection-Evasion Behaviors of Files Undergoing Malware Analyses; U.S. Appl. No. 14/567,440, filed Dec. 11, 2014.
Andrew Watson; Systems and Methods for Accelerating Malware Analyses in Automated Execution Environments; U.S. Appl. No. 14/569,163, filed Dec. 12, 2014.
Bianchi, Antonio "Blacksheep: Detecting Compromised Hosts in Homogeneous Crowds", https://seclab.cs.ucsb.edu/media/uploads/papers/blacksheep.pdf, as accessed Oct. 15, 2014, CCS'12, Raleigh, North Carolina, (Oct. 16-18, 2012).
Hyde, Doug "A Survey on the Security of Virtual Machines", http://www.cse.wustl.edu/~jain/cse571-09/ftp/vmsec/index.html, as accessed Oct. 15, 2014, (2009).
Baliga, Arati et al., "Automated Defense from Rootkit Attacks", http://www.vmware.com/pdf/cambridge_rootkit.pdf, as accessed Oct. 15, 2014, (May 16, 2006).
"Securonix", http://www.securonix.com/2014/03/securonix-announces-the-release-of-data-exfiltration-intelligence-application-delivers-the-industrysfirst-proactive-detection-and-prevention-against-insider-and-external-data-exfiltration-attacks/, as accessed Oct. 15, 2014, (2013).
"Data Exfiltration Intelligence Product Tour", http://www.securonix.com/secureproduct/dataexfiltration/, as accessed Oct. 15, 2014, Securonix, Inc, (2013).
"Detect Data Exfiltration with Flow Collection and Analysis", http://www.lancope.com/solutions/security-operations/data-loss/, as accessed Oct. 15, 2014, Lancope, Inc., (Mar. 3, 2011).
Zeltser, Lenny "Speeding up the Clock for Malware Analysis With Accelerify", http://blog.zeltser.com/post/49399925347/accelerify-speeds-up-clock-for-malware, as accessed Oct. 15, 2014, (May 1, 2013).
"FireEye, Inc.", https://www.fireeye.com/, as accessed Oct. 15, 2014, (Oct. 12, 1999).
"Palo Alto Networks", https://www.paloaltonetworks.com/, as accessed Oct. 15, 2014, (Oct. 18, 2000).
"Blue Coat", https://www.bluecoat.com/, as accessed Oct. 15, 2014, (Mar. 24, 2002).
Clausing, Jim "Building an Automated Behavioral Malware Analysis Environment using Open Source Software", http://www.sans.org/reading-room/whitepapers/tools/building-automated-behavioral-malware-analysis-environment-open-sourcesoftware-33129, as accessed Oct. 15, 2014, SANS Institute InfoSec Reading Room, (2009).
Song, Chengyu et al., "Impeding Automated Malware Analysis with Environment-sensitive Malware", https://www.usenix.org/system/files/conference/hotsec12/hotsec12-final24.pdf, as accessed Oct. 15, 2012, HotSec '12, 7th USENIX Workshop on Hot Topics in Security, Bellevue, WA, (Aug. 7, 2012).
"Chapter 6: Malware Analysis Basics", http://www.porcupine.org/forensics/forensic-discovery/chapter6.html, as accessed Oct. 15, 2014, (Jan. 16, 2006).
"BruCON", http://2014.brucon.org/index.php/, as accessed Oct. 15, 2014, (On or before Oct. 15, 2014).
"Mandiant, A FireEye Company", https://www.mandiant.com/training/course/malware-analysis-crash-course-at-mircon, as accessed Oct. 15, 2014, (Aug. 14, 2014).
"Training Courses—Malware Analysis", https://www.mandiant.com/training/courses/black-hat-trainings-malware-analysis-crash-course, as accessed Oct. 15, 2014, Mandiant, A FireEye Company, (On or before Oct. 15, 2014).
"Cuckoo Sandbox", http://www.cuckoosandbox.org/about.html, as accessed Oct. 15, 2014, (Nov. 13, 2012).
Vashisht, Sai Omkar et al., "Turing Test in Reverse: New Sandbox-Evasion Techniques Seek Human Interaction", https://www.fireeye.com/blog/threat-research/2014/06/turing-test-in-reverse-new-sandbox-evasion-techniques-seek-human-interaction.html, as accessed Nov. 12, 2014, FireEye, Inc., (Jun. 24, 2014).
Lewis, Nick "Sandbox evasion: How to detect cloaked malware", http://searchsecurity.techtarget.com/answer/Sandbox-evasion-How-to-detect-cloaked-malware, as accessed Nov. 12, 2014, (Jul. 2014).
Mimoso, Michael "Shylock Malware Evasion Techniques Now Detect RDP Connections", http://threatpost.com/shylock-malware-evasion-techniques-now-detect-rdp-connections-112912/77260, as accessed Nov. 12, 2014, (Nov. 29, 2012).
Cannell, Joshua "A Look at Malware with Virtual Machine Detection", https://blog.malwarebytes.org/intelligence/2014/02/a-look-at-malware-with-virtual-machine-detection/, as accessed Nov. 12, 2014, (Feb. 6, 2014).
"How does malware know the difference between the virtual world and the real world?", http://vrt-blog.snort.org/2009/10/how-does-malware-know-difference.html, as accessed Nov. 12, 2014, (Oct. 14, 2009).
Mushtaq, Atif "The Dead Giveaways of VM-Aware Malware", https://www.fireeye.com/blog/threat-research/2011/01/the-dead-giveaways-of-vm-aware-malware.html, as accessed Nov. 12, 2014, FireEye, Inc., (Jan. 27, 2011).
"Windows Programming/User Mode vs Kernel Mode", http://en.wikibooks.org/wiki/Windows_Programming/User_Mode_vs_Kernel_Mode, as accessed Nov. 12, 2014, Wikibooks, (Feb. 19, 2006).

* cited by examiner

SYSTEMS AND METHODS FOR PROTECTING AUTOMATED EXECUTION ENVIRONMENTS AGAINST ENUMERATION ATTACKS

BACKGROUND

Automated execution environments (sometimes referred to as "sandboxes") are often used to facilitate controlled execution and/or observation of suspicious and/or unknown files. For example, an automated execution environment may execute a file sample to observe whether the file sample exhibits any potentially malicious behaviors. By executing and observing the file sample in this way, the automated execution environment may be able to determine that a file is malicious without exposing the underlying computing platform to certain risks associated with the malicious file.

Unfortunately, conventional automated execution environments may still have certain deficiencies and/or vulnerabilities that allow unscrupulous outsiders to gain access to the proprietary inner workings of those environments. For example, an unscrupulous outsider may develop a malicious file that is able to identify certain internal processes and/or mechanisms of an automated execution environment and then extract a description of those processes and/or mechanisms. This practice is sometimes referred to as an "enumeration attack."

Enumeration attacks may serve their perpetrators in different ways. For example, a malware author may perform an enumeration attack on an automated execution environment in an effort to avoid any detection of malware by hiding certain malicious behaviors from the automated execution environment. Additionally or alternatively, a competing security developer and/or vendor may perform an enumeration attack on an automated execution environment in an effort to reverse-engineer the automated execution environment and/or obtain certain trade secrets from the competition.

The instant disclosure, therefore, identifies and addresses a need for additional and improved systems and methods for protecting automated execution environments against enumeration attacks.

SUMMARY

As will be described in greater detail below, the instant disclosure describes various systems and methods for protecting automated execution environments against enumeration attacks by detecting behaviors consistent with an enumeration attack during a malware analysis and then terminating the malware analysis prior to the completion of the enumeration attack.

In one example, a computer-implemented method for protecting automated execution environments against enumeration attacks may include (1) monitoring a file that is undergoing a malware analysis in an automated execution environment, (2) while monitoring the file, detecting one or more behaviors exhibited by the file during the malware analysis in the automated execution environment, (3) determining, based at least in part on the behaviors exhibited by the file, that the file is attempting to discover one or more resources used in connection with the malware analysis, and then in response to determining that the file is attempting to discover the resources used in connection with the malware analysis, (4) terminating the malware analysis in an effort to undermine the file's attempt to discover the resources used in connection with the malware analysis.

In some examples, determining that the file is attempting to discover the resources used in connection with the malware analysis may include determining that the file is searching for one or more processes or components implemented by the automated execution environment during the malware analysis. In some examples, the computer-implemented method may further include determining that the file is attempting to exfiltrate proprietary information about the resources used in connection with the malware analysis.

In some examples, determining that the file is attempting to discover the resources used in connection with the malware analysis may include determining, based at least in part on the file's attempt to discover the resources used in connection with the malware analysis and exfiltrate the proprietary information about the resources used in connection with the malware analysis, that the file is engaging in an enumeration attack. In some examples, terminating the malware analysis may include terminating, in response to determining that the file is engaging in the enumeration attack, the malware analysis in an effort to undermine the file's enumeration attack.

In some examples, determining that the file is attempting to exfiltrate the proprietary information about the resources used in connection with the malware analysis may include determining that the file is attempting to transmit the proprietary information by (1) binding a network port, (2) establishing a connection with a network device, (3) executing a remote shell, and/or (4) transmitting a request for a task to be performed by the file. In some examples, the computer-implemented method may further include classifying the file as potentially malicious due at least in part to the file engaging in the enumeration attack.

In some examples, monitoring the file that is undergoing the malware analysis may include directing the automated execution environment to execute the file in connection with the malware analysis. In some examples, monitoring the file that is undergoing the malware analysis may include monitoring the file by monitor components that include (1) a user-mode hook, (2) a kernel-mode hook, (3) a packet capture component, (4) a file system monitor, and/or (5) a network switch. In some examples, determining that the file is attempting to discover the resources used in connection with the malware analysis may include determining that the file is (1) attempting to determine whether the file being subjected to a malware analysis in an automated execution environment, (2) searching for files involved in performing the malware analysis, (3) attempting to detect one or more monitor components that are monitoring the file during the malware analysis, and/or (4) attempting to identify one or more computing devices in the automated execution environment.

In some examples, determining that the file is attempting to discover the resources used in connection with the malware analysis may further include (1) assigning, to the file based at least in part on the behaviors exhibited by the file, a threat score indicating a likelihood that the file is attempting to discover the resources used in connection with the malware analysis and (2) determining, due at least in part to the threat score exceeding a certain threshold, that the file is attempting to discover the resources used in connection with the malware analysis.

In one embodiment, a system for implementing the above-described method may include several modules stored in memory, such as (1) a monitoring module that monitors a file that is undergoing a malware analysis in an automated execution environment, (2) a detection module that, while monitoring the file, detects one or more behaviors exhibited by the file during the malware analysis in the automated execution environment, (3) an analysis module that determines, based at least in part on the behaviors exhibited by the file, that the file is attempting to discover one or more resources used in connection with the malware analysis, and (4) a security module that, in response to the determination that the file is attempting to discover the resources used in connection with the malware analysis, terminates the malware analysis in an effort to undermine the file's attempt to discover the resources used in connection with the malware analysis. The system may also include at least one physical processor configured to execute the monitoring module, the detection module, the analysis module, and the security module.

In some examples, the above-described method may be encoded as computer-readable instructions on a non-transitory computer-readable medium. For example, a computer-readable medium may include one or more computer-executable instructions that, when executed by at least one processor of a computing device, causes the computing device to (1) monitor a file that is undergoing a malware analysis in an automated execution environment, (2) detect, while monitoring the file, one or more behaviors exhibited by the file during the malware analysis in the automated execution environment, (3) determine, based at least in part on the behaviors exhibited by the file, that the file is attempting to discover one or more resources used in connection with the malware analysis, and then in response to the determination that the file is attempting to discover the resources used in connection with the malware analysis, (4) terminate the malware analysis in an effort to undermine the file's attempt to discover the resources used in connection with the malware analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting automated execution environments against enumeration attacks. As will be explained in greater detail below, by monitoring a file undergoing a malware analysis in an automated execution environment, the systems and methods described herein may detect one or more suspicious behaviors exhibited by the file during the malware analysis. Moreover, by detecting the suspicious behaviors, the systems and methods described herein may determine that the file undergoing malware analysis is engaged in an enumeration attack. In response to this determination, the systems and methods described herein may terminate the malware analysis prior to the completion of the enumeration attack in an effort to undermine the enumeration attack.

Figure 1:
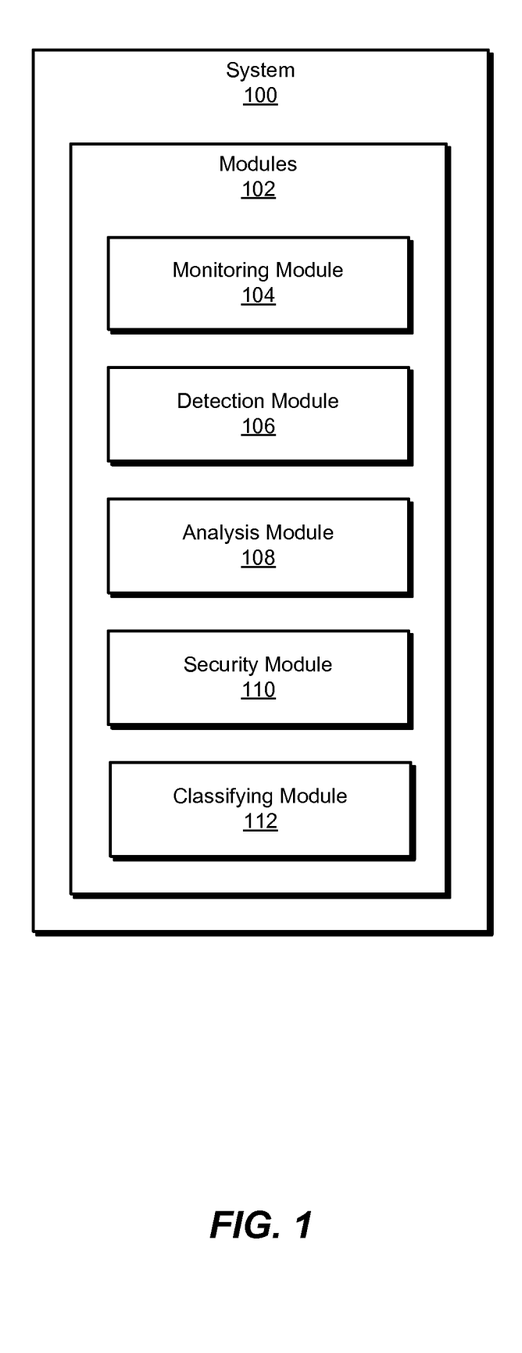
FIG. 1 is a block diagram of an exemplary system for protecting automated execution environments against enumeration attacks.
Figure 2:
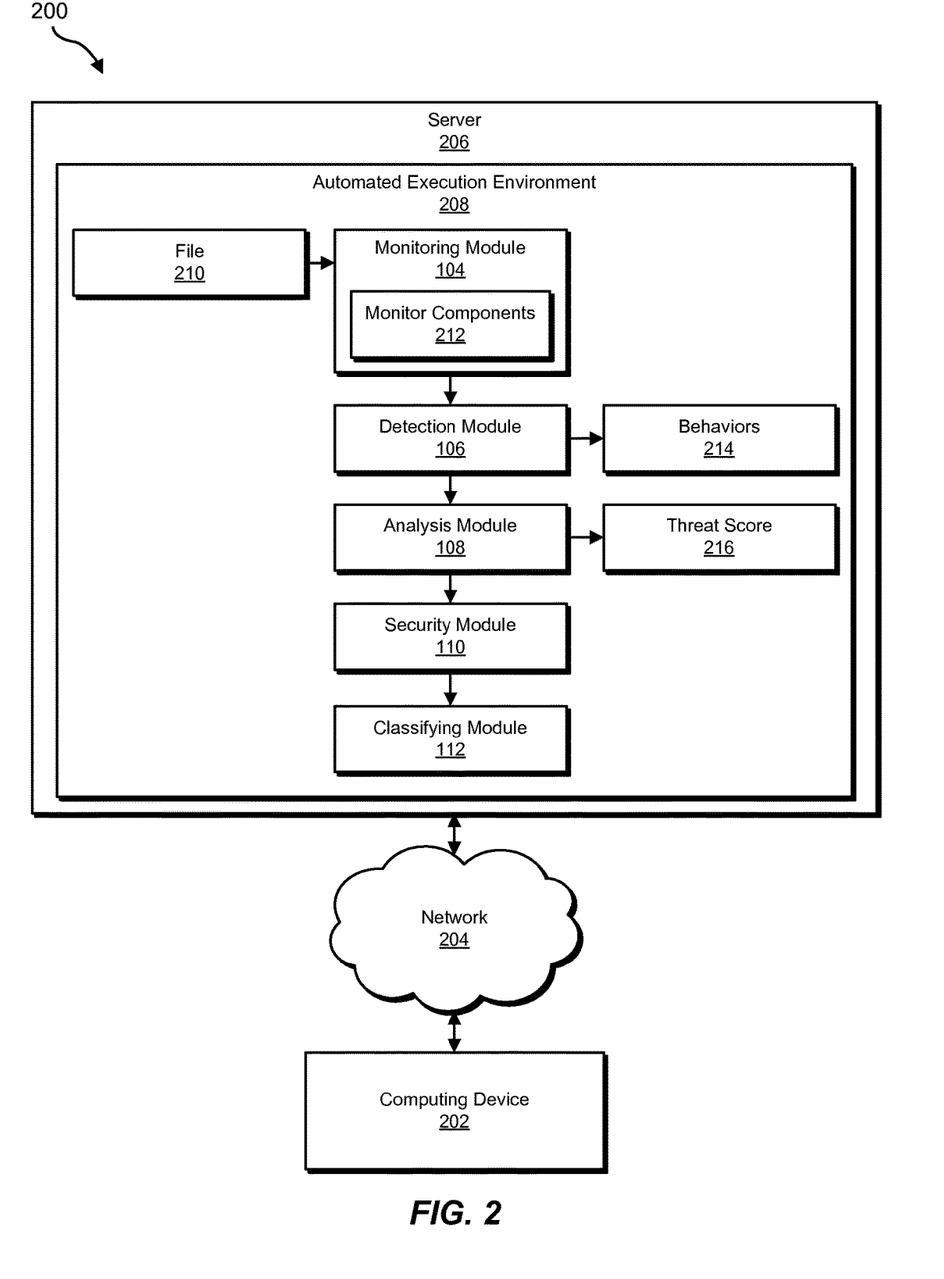
FIG. 2 is a block diagram of an additional exemplary system for protecting automated execution environments against enumeration attacks.

The following will provide, with reference to FIGS. 1-2, detailed descriptions of exemplary systems for protecting automated execution environments against enumeration attacks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for protecting automated execution environments against enumeration attacks. As illustrated in this figure, exemplary system 100 may include one or more modules 102 for performing one or more tasks. For example, and as will be explained in greater detail below, exemplary system 100 may also include a monitoring module 104 that monitors a file that is undergoing a malware analysis in an automated execution environment. Exemplary system 100 may additionally include a detection module 106 that detects, while monitoring the file, one or more behaviors exhibited by the file during the malware analysis in the automated execution environment. Exemplary system 100 may also include an analysis module 108 that determines, based at least in part on the behaviors exhibited by the file, that the file is attempting to discover one or more resources used in connection with the malware analysis. Exemplary system 100 may additionally include a security module 110 that terminates, in response to the determination, the malware analysis in an effort to undermine the file's attempt to discover the resources used in connection with the malware analysis. Exemplary system 100 may also include a classifying module 112 that that classifies the file as potentially malicious due at least in part to the file engaging in the enumeration attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, server 206 may include an automated execution environment 210 that performs a malware analysis on a file 210. In this example, server 206 may be programmed with one or more of modules 102. Additionally or alternatively, computing device 202 may be programmed with one or more of modules 102.

In one example, server 206 may include one or more monitor components 212 that observe and/or log behaviors 214 exhibited by file 210 in connection with the malware analysis performed on file 210. Additionally or alternatively, computing device 202 may include one or more monitor components 212 that observe and/or log behaviors 214 exhibited by file 210 in connection with the malware analysis performed on file 210.

In one example, one or more of modules 102 may compute and/or assign a threat score 216 to file 210 based at least in part on behaviors 214 exhibited by file 210. In this example, threat score 216 may indicate and/or represent the likelihood that file 210 is attempting to discover certain resources used in connection with the malware analysis.

In one embodiment, one or more of modules 102 from FIG. 1 may, when executed by at least one processor of computing device 202 and/or server 206, enable computing device 202 and/or server 206 to protect automated execution environments against enumeration attacks. For example, and as will be described in greater detail below, monitoring module 104 may monitor file 210 undergoing a malware analysis in automated execution environment 208. Detection module 106 may detect, while monitoring file 210, one or more of behaviors 214 exhibited by file 210 during the malware analysis in automated execution environment 208. Analysis module 108 may determine, based at least in part on behaviors 214 exhibited by file 210, that file 210 is attempting to discover one or more resources used in connection with the malware analysis. Security module 110 may then terminate the malware analysis in an effort to undermine the file's attempt to discover the resources used in connection with the malware analysis.

Computing device 202 generally represents one or more of any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device capable of performing malware analyses on files and/or observing computing activity in connection with malware analyses. Examples of server 206 include, without limitation, application servers, security servers, web servers, storage servers, deduplication servers, and/or database servers configured to run certain software applications and/or provide various security, web, storage, deduplication, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Monitor components 212 generally represent any type or form of device, program, and/or mechanism that monitors, observes, and/or logs computing activity occurring in connection with malware analyses. In one example, monitor components 212 may represent portions of monitoring module 104. In another example, monitor components 212 may be separate and distinct from monitoring module 104. Examples of monitor components 212 include, without limitation, user mode hooks, kernel mode hooks, Packet CAPture (PCAP) components, file system monitors, network switches, variations of one or more of the same, combinations of one or more of the same, or any other suitable monitor components.

As a specific example, one of monitor components 212 may represent a user mode hook that is internal to automated execution environment 208. Additionally or alternatively, one of monitor components 212 may represent a kernel mode hook that is internal to automated execution environment 208.

Although illustrated as portions of server 206 in FIG. 2, monitor components 212 may also include and/or represent portions of network 204 and/or computing device 202. For example, one of monitor components 212 may represent a PCAP component included in network 204 and/or computing device 202. Additionally or alternatively, one of monitor components 212 may represent a network switch included in network 204.

Automated execution environment 208 generally represents any type or form of computing environment and/or mechanism that facilitates controlled execution, monitoring, and/or observation of file samples to determine whether such file samples contain malware. In one example, automated execution environment 208 may execute file 210 to facilitate a malware analysis that involves monitoring and/or observing the run-time characteristics, attributes, and/or behaviors of file 210. In this example, automated execution environment 208 may limit and/or restrict certain resources (such as files, file systems, memory locations, and/or network functionalities) from being accessed and/or used by file 210 during the malware analysis. By limiting and/or restricting such resources in this way, automated execution environment 208 may be able to facilitate the malware analysis without exposing the underlying computing platform to certain risks potentially associated file 210.

File 210 generally represents any type or form of file, portion of a file, and/or file sample that includes data, metadata, and/or information. In one example, file 210 may include one or more data segments that represent a complete file. In another example, file 210 may include one or more data segments that represent a file sample or portion selected from a complete file. Examples of file 210 include, without limitation, executable files, document files, data files, batch files, archive files, media files, backup files, library files, compressed files, scripts, binary code, machine code, samples or portions of one or more of the same, variations of one or more of the same, combinations of one or more of the same, or any other suitable file.

Figure 3:
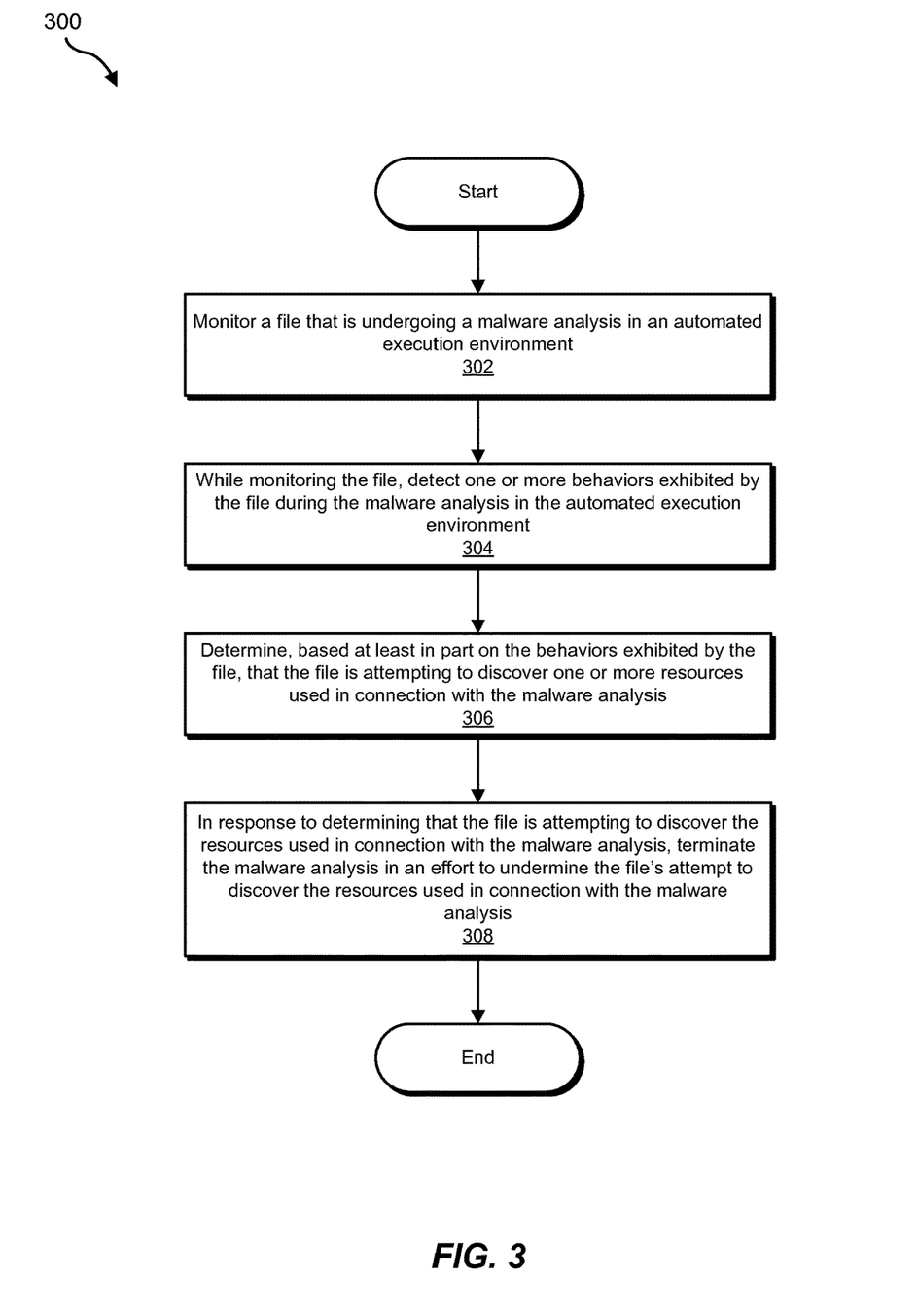
FIG. 3 is a flow diagram of an exemplary method for protecting automated execution environments against enumeration attacks.

FIG. 3 is a flow diagram of an exemplary computer-implemented method 300 for protecting automated execution environments against enumeration attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may monitor a file that is undergoing a malware analysis in an automated execution environment. For example, monitoring module 104 may, as part of server 206 and/or computing device 202 in FIG. 2, monitor file 210 that is undergoing a malware analysis in automated execution environment 208.

The systems described herein may perform step 302 in a variety of ways and/or contexts. In one example, monitoring module 104 may direct automated execution environment 208 to execute file 210 in connection with the malware analysis. For example, monitoring module 104 may identify file 210 as being new, unknown, and/or suspicious relative to a computing community (such as a security vendor's customer base). In this example, monitoring module 104 may direct automated execution environment 208 to execute file 210 to facilitate a malware analysis that involves monitoring and/or observing run-time characteristics, attributes, and/or behaviors of file 210.

In some examples, monitoring module 104 may monitor file 210 undergoing the malware analysis based at least in part on one or more monitor components 212. As a specific example, monitor components 212 may include and/or represent user mode hooks that record and/or log application programming interface (API) calls within automated execution environment 208. In this example, the user mode hooks may include and/or represent code (e.g., a jump instruction) inserted at the beginning of certain API functions (e.g., a connect function and/or a listen function) that are operable in user mode. This code (sometimes referred to as a "trampoline") may temporarily transfer the flow of execution from those API functions to another memory location where additional code records and/or logs any calls to those API functions. Upon recording and/or logging API calls in this way, the additional code may transfer the flow of execution back to the called API functions.

Additionally or alternatively, monitor components 212 may include and/or represent kernel mode hooks that record and/or log API calls within automated execution environment 208. In this example, the kernel mode hooks may include and/or represent code (e.g., a jump instruction) inserted at the beginning of certain Native API functions (e.g., a WriteFile function and/or a ReadFile function) that are operable in kernel mode. This code may temporarily transfer the flow of execution from those Native API functions to another memory location where additional code records and/or logs any calls to those Native API functions. Upon recording and/or logging API calls in this way, the additional code may transfer the flow of execution back to the called Native API functions.

As another example, a monitor component within monitor components 212 may include and/or represent a PCAP component and/or a network switch. In this example, the PCAP component and/or network switch may record and/or log network traffic originating from server 206 as a result of the execution of file 210 by automated execution environment 208.

At step 304, one or more of the systems described herein may detect, while monitoring the file, one or more behaviors exhibited by the file during the malware analysis in the automated execution environment. For example, detection module 106 may, as part of server 206 and/or computing device 202 in FIG. 2, detect one or more of behaviors 214 exhibited by file 210 during the malware analysis in automated execution environment 208. In this example, the detected behaviors 214 may indicate and/or suggest that file 210 is engaged in an enumeration attack.

Detection module 106 may detect suspected enumeration attack behaviors in a variety of ways. In one example, detection module 106 may detect behaviors 214 based at least in part on monitor components 212. For example, detection module 106 may analyze one or more logs and/or records of computing activity maintained by monitor components 212 in connection with the malware analysis. In this example, the logs and/or records may include evidence of behaviors exhibited by file 210 during the malware analysis. Accordingly, detection module 106 may determine that file 210 exhibited behaviors 214 during the malware analysis by analyzing those logs and/or records.

In one example, detection module 106 may detect an API call and/or execution of a program initiated by file 210 to identify certain processes and/or mechanisms implemented by automated execution environment 208. In another example, detection module 106 may detect a search initiated by file 210 of a file system in automated execution environment 208. In this example, the search may attempt to identify specific files used by automated execution environment 208 during the malware analysis. In a further example, detection module 106 may detect an attempt by file 210 to identify user-mode hooks and/or kernel mode hooks used by automated execution environment 208 as part of the malware analysis.

In an additional example, detection module 106 may detect an attempt by file 210 to determine whether file 210 is being executed by a virtual machine or a physical computing device. For example, detection module 106 may detect an attempt by file 210 to determine whether device drivers implemented by automated execution environment 208 correspond to a virtual machine or a physical computing device.

In the event that file 210 determines that file 210 is being executed by an automated execution environment, file 210 may initiate one or more detection-evasion behaviors in an effort to avoid detection. The term "detection-evasion behavior," as used herein, generally refers to any type or form of run-time characteristic, attribute, and/or behavior of a file that potentially enables the file to avoid being identified as malware and/or being suspected of containing malware. In one example, the detection-evasion behaviors demonstrated by file 210 may indicate and/or suggest that file 210 is attempting to evade detection by obfuscating the computing activity from monitor components 212. Examples of these detection-evasion behaviors include, without limitation, skipping memory locations that include user mode hooks and/or kernel mode hooks within an automated execution environment, searching for user mode hooks and/or kernel mode hooks within an automated execution environment, diverting the flow of execution due at least in part to user mode hooks and/or kernel mode hooks detected within an automated execution environment, variations of one or more of the same, combinations of one or more of the same, or any other detection-evasion behavior.

In another example, detection module 106 may detect network activities indicating that file 208 is attempting to exfiltrate proprietary information about the resources used in connection with the malware analysis. For example, detection module 106 may detect an attempt by file 208 to bind a network port. Binding a network port may represent an attempt by file 208 to initiate communication with a network device. After binding a network port, file 208 may attempt to use network protocols such as internet protocol (IP) to communicate with networked devices. In another example, detection module 106 may detect an attempt by file 208 to establish a connection with a network device. File 208 may use other protocols to communicate with network devices, such as using hypertext transfer protocol (HTTP) to communicate with a web server.

In another example, detection module 106 may detect an attempt by file 208 to execute a remote shell. Executing a remote shell may permit a person or program to remotely execute commands on the computing device. Examples of remote shells include WINDOWS remote shell for MICROSOFT WINDOWS and rsh for LINUX and UNIX operating systems. The PuTTY terminal emulation program is also available on various operating systems and can be used to transmit information or permit remote control of the local computing device. In another example, detection module 106 may detect an attempt by file 208 to transmit a request for a task to be performed by file 208. Using any of the available means of communication or remote control, file 208 may request or receive a task to be performed on the computing device. The task may represent an attempt to gain control of computing devices, inflict damage, and/or obtain sensitive information.

At step 306, one or more of the systems described herein may determine, based at least in part on the behaviors exhibited by the file, that the file is attempting to discover one or more resources used in connection with the malware analysis. For example, analysis module 108 may, as part of server 206 and/or computing device 202 in FIG. 2, determine that file 208 is attempting to discover one or more resources used in connection with the malware analysis. Analysis module 108 may arrive at this determination based at least in part on behaviors 214 exhibited by file 208 during the malware analysis. Examples of the resources used in connection with the malware analysis include, without limitation, files (such as configuration files or log files) involved in performing the malware analysis, user-mode or kernel-mode memory hooks, computing devices within or connected to the automated execution environment, combinations of one or more of the same, or any other suitable resources.

The systems described herein may perform step 306 in a variety of ways and/or contexts. In some examples, analysis module 108 may determine that file 210 is searching for one or more processes or components implemented by automated execution environment 208 during the malware analysis based at least in part on an API call and/or execution of a program initiated by file 210. Analysis module 108 may also determine, based at least in part on such a search, that file 210 is attempting to identify specific files used in connection with the malware analysis. In a further example, analysis module 108 may determine that file 210 is attempting to identify resources used in connection with the malware analysis based at least in part on one or more attempts by file 210 to identify user-mode or kernel-mode hooks used by automated execution environment.

In some examples, systems described herein may determine that file 210 is attempting to exfiltrate proprietary information about the resources used in connection with the malware analysis. For example, analysis module 108 may determine that file 210 is engaging in various network activities in an attempt to exfiltrate proprietary information used in connection with the malware analysis (e.g., information that identifies resources used by automated execution environment 208). A PCAP component and/or network switch within monitor components 212 may detect, record, and/or log network activities resulting from the execution of file 210 by automated execution environment 208. These network activities may indicate that file 210 is attempting to exfiltrate collected proprietary information. Network traffic associated with an enumeration attack may include a variety of actions or attempted actions, such as binding a network port, establishing a connection with a network device, executing a remote shell, transmitting a file, and/or transmitting a request for a task to be performed by the file.

In one example, analysis module 108 may determine that 210 is engaging in an enumeration attack based at least in part on the combination of (1) the file's attempt to discover the resources used in connection with the malware analysis and (2) the file's attempt to exfiltrate the proprietary information about the resources used in connection with the malware analysis.

In some examples, analysis module 108 may combine behaviors of file 210 detected by detection module 106 to determine that file 210 has obtained information identifying certain processes and/or mechanisms used in connection with the malware analysis and has attempted to exfiltrate the information to a person or network location outside automated execution environment 208. Analysis module 108 may estimate the likelihood that file 210 is engaged in an enumeration attack based at least in part on certain weights assigned to the observed behaviors of file 210.

In some examples, systems described herein may determine that file 210 is attempting to discover one or more resources used in connection with the malware analysis by (1) assigning, to file 210 based at least in part on behaviors exhibited by the file, a threat score indicating the likelihood that file 210 is attempting to discover the resources used in connection with the malware analysis and (2) determining, based at least in part on the threat score exceeding a threshold, that file 210 is attempting to discover the resources used in connection with the malware analysis. For example, analysis module 108 may assign threat score 216 to file 210. Analysis module 108 may determine, based at least in part on threat score 216 exceeding a certain threshold, that file 210 is attempting to discover resources used in connection with the malware analysis. Either benign files or malware files not engaged in an enumeration attack may perform one or more behaviors associated with an enumeration attack.

Systems described herein may distinguish between a file engaged in an enumeration attack and a file not engaged in an enumeration attack by analyzing the behaviors exhibited by file 210, determining how indicative the behaviors are of an enumeration attack, and then assigning a threat score to file 210 based at least in part on the behaviors exhibited by file 210. If the threat score assigned to file 210 exceeds a threshold, systems described herein may determine that file 210 is attempting to discover the resources used in connection with the malware analysis, and therefore likely to be engaged in an enumeration attack.

In a specific example, analysis module 108 may detect that file 210 has called an API to obtain a list of processes running in automated execution environment 208 and has read the contents of the hosts file. Analysis module 108 may determine that each of these activities are associated with a 20 percent probability that file 210 is attempting to discover the resources used in connection with the malware analysis, but the total threat score of 40 does not exceed a threshold level of 50, and therefore file 210 is likely not attempting to discover the resources used in connection with the malware analysis. In another example, analysis module 108 may determine that, in addition to the activities described above, file 210 has attempted to establish a connection with a specific web server, an activity that analysis module 108 associates with a 30 percent probability that file 210 is attempting to discover the resources used in connection with the malware analysis. Because the threat score of 70 associated with file 210 in this example exceeds the threshold level of 50, analysis module 108 may determine that file 210 is likely attempting to discover the resources used in connection with the malware analysis.

At step 308, one or more of the systems described herein may terminate, in response to the determination, the malware analysis in an effort to undermine the file's attempt to discover the resources used in connection with the malware analysis. For example, security module 110 may, as part of server 206 and/or computing device in FIG. 2, terminate the malware analysis in an effort to undermine and/or thwart the attempt by file 210 to discover the resources used in connection with the malware analysis. Security module 110 may initiate the termination of the malware analysis in response to the determination that file 208 is attempting to discover the resources used in connection with the malware analysis.

Systems described herein may terminate the malware analysis in a variety of ways and/or contexts. For example, security module 110 may terminate the malware analysis by directing automated execution environment 208 to stop executing file 210. In another example, security module 110 may terminate one or more processes and/or mechanisms running in automated execution environment 208 in connection with the malware analysis. In a further example, security module 110 may collect any log files or other data associated with the malware analysis for further study by administrators or automated processes outside automated execution environment 208. In some examples, classifying module 112 may classify the file as potentially malicious due at least in part to the file engaging in the enumeration attack.

As described above, the systems and methods described herein may monitor a file undergoing malware analysis in an automated execution environment in order to detect behaviors consistent with an enumeration attack, analyze the behaviors to determine whether the file is engaged in an enumeration attack, and when an enumeration attack is detected, terminate the malware analysis to prevent the file from exfiltrating information regarding the configuration of the automated execution environment. In this way, the systems and methods described herein may prevent malware designers and competitors from obtaining intellectual property that represents a considerable investment of cost and effort.

Figure 4:
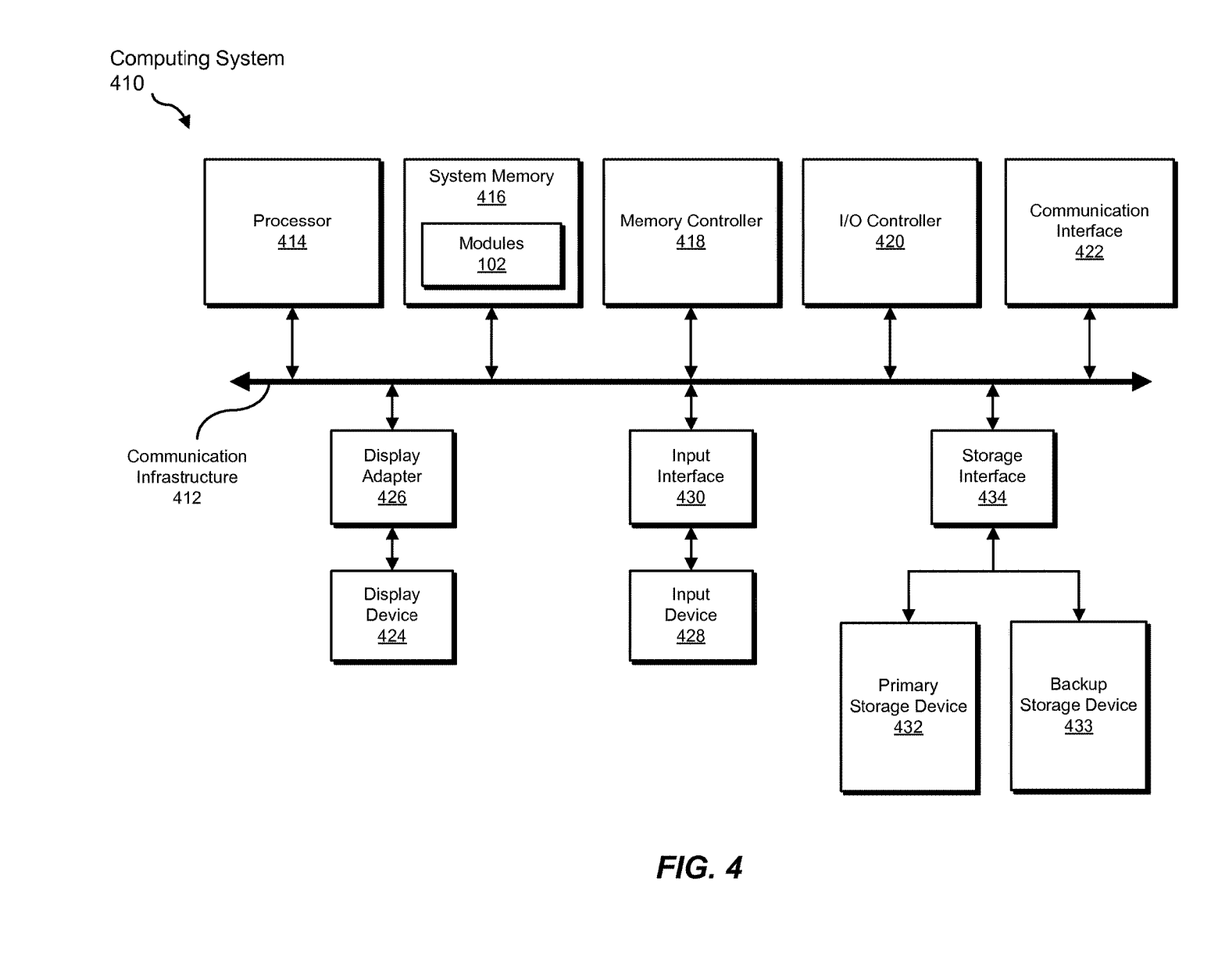
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
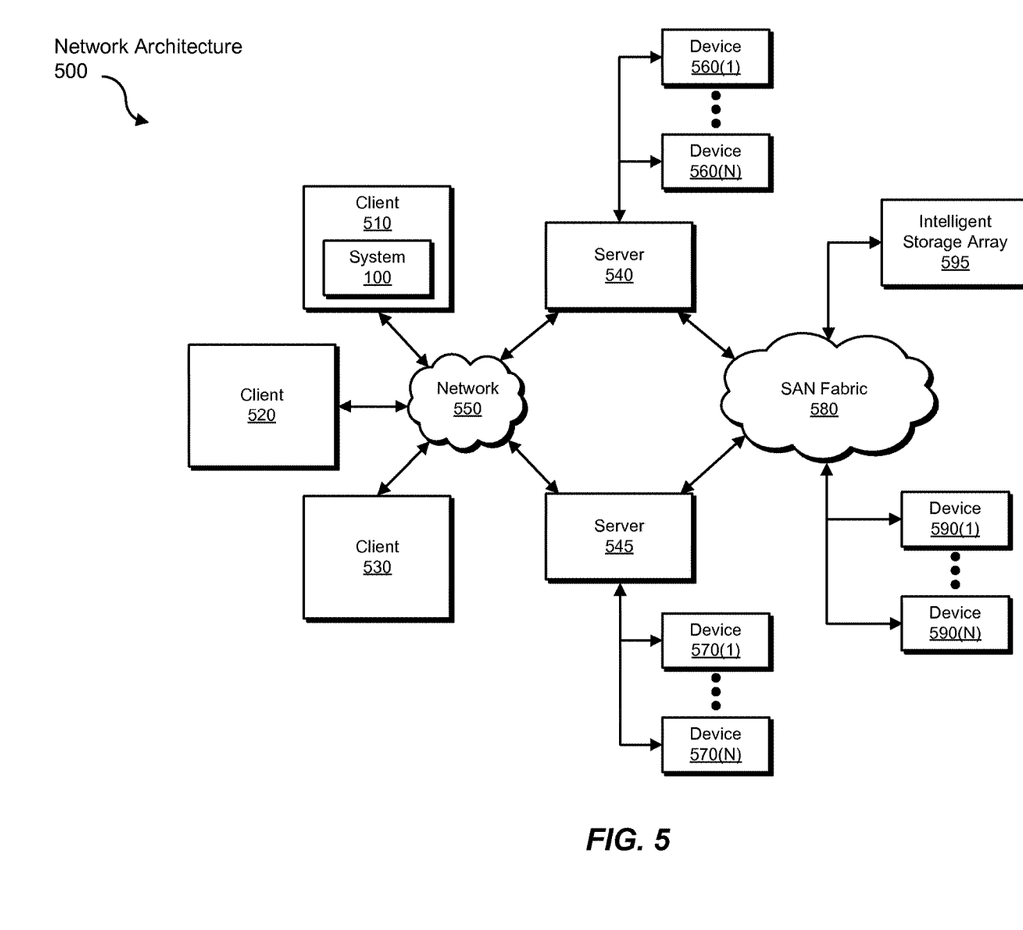
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for protecting automated execution environments against enumeration attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive suspected malware files to be transformed, transform the suspected malware files to observations of suspected malware behavior, use the result of the transformation to determine that the suspected malware file is engaged in an enumeration attack, and store the result of the transformation to associate the suspected malware file with the observed behaviors. Additionally, one or more of the modules recited herein may transform a computing system to a system for protecting automated execution environments against enumeration attacks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting sandboxes against enumeration attacks, at least a portion of the method being performed by a computing device comprising at least one processor, the method comprising:
    monitoring a file undergoing a malware analysis in a sandbox, the file being controlled and observed in the sandbox without exposing an underlying computing platform to certain risks associated with the file;
    while monitoring the file during the malware analysis, determining that the file is attempting to perform an enumeration attack on the sandbox, the enumeration attack being an attempt to discover proprietary information about a resource of the sandbox and exfiltrate the proprietary information to at least one of a person or a network location outside the sandbox, wherein determining that the file is attempting to perform the enumeration attack comprises:

detecting, via a hook that is internal to the sandbox and that records an Application Programming Interface (API) call initiated in connection with the file, one or more run-time behaviors exhibited by the file during the malware analysis that are indicative of an enumeration attack, the one or more run-time behaviors comprising searching, by the file, for one or more processes or components implemented by the sandbox during the malware analysis; and determining, based at least in part on the file searching for the one or more processes or components during the malware analysis, that the file is attempting to perform the enumeration attack on the sandbox; and in response to determining that the file is attempting to perform the enumeration attack, terminating the malware analysis.

2. The computer-implemented method of claim 1, wherein:

detecting the file's one or more run-time behaviors comprises detecting, based at least in part on the hook that records the API call, that the file is attempting to execute a remote shell; and determining that the file is attempting to perform the enumeration attack comprises making the determination based at least in part on the file's attempt to execute the remote shell.

3. The computer-implemented method of claim 1, wherein:

detecting the file's one or more run-time behaviors comprises detecting, based at least in part on the hook that records the API call, that the file is attempting to bind a network port; and determining that the file is attempting to perform the enumeration attack comprises making the determination based at least in part on the file's attempt to bind the network port, that the file is attempting to perform the enumeration attack.

4. The computer-implemented method of claim 1, further comprising classifying the file as potentially malicious due at least in part to the file's attempt to perform the enumeration attack.

5. The computer-implemented method of claim 1, wherein monitoring the file that is undergoing the malware analysis comprises directing the sandbox to execute the file in connection with the malware analysis.

6. The computer-implemented method of claim 1, wherein monitoring the file that is undergoing the malware analysis comprises monitoring the file by one or more monitor components comprising at least one of:

a user-mode hook;
a kernel-mode hook;
a packet capture component;
a file system monitor; and
a network switch.

7. The computer-implemented method of claim 1, wherein determining that the file is attempting to perform the enumeration attack further comprises determining that the file is at least one of:

attempting to determine whether the file is being subjected to a malware analysis in a sandbox;
attempting to discover one or more resources of the sandbox;
searching for files involved in performing the malware analysis;
attempting to detect one or more monitor components that are monitoring the file during the malware analysis; and
attempting to identify one or more computing devices in the sandbox.

8. The computer-implemented method of claim 1, wherein determining that the file is attempting to the enumeration attack further comprises:

assigning, to the file based at least perform in part on the run-time behaviors exhibited by the file, a threat score indicating a likelihood that the file is attempting to discover the resources used in connection with the malware analysis; and determining, due at least in part to the threat score exceeding a certain threshold, that the file is attempting to discover the resources used in connection with the malware analysis.

9. A system for protecting sandboxes against enumeration attacks, the system comprising:

a monitoring module, stored in memory, that monitors a file undergoing a malware analysis in a sandbox, the file being controlled and observed in the sandbox without exposing an underlying computing platform to certain risks associated with the file;

a detection module, stored in memory, that, while monitoring the file, detects, via at least one hook that records an Application Programming Interface (API) call initiated in connection with the file, one or more run-time behaviors exhibited by the file during the malware analysis that are indicative of an enumeration attack, the enumeration attack being an attempt to discover proprietary information about a resource of the sandbox and exfiltrate the proprietary information to at least one of a person and a network location outside the sandbox, wherein the one or more run-time behaviors comprise searching, by the file, for one or more processes or components implemented by the sandbox during the malware analysis;

an analysis module, stored in memory, that determines, based at least in part on the file searching for the one or more processes or components during the malware analysis, that the file is attempting to perform the enumeration attack on the sandbox;

a security module, stored in memory, that, in response to the determination that the file is attempting to perform the enumeration attack, terminates the malware analysis; and at least one physical processor configured to execute the monitoring module, the detection module, the analysis module, and the security module.

10. The system of claim 9, wherein the analysis module determines that the file is attempting to perform the enumeration attack by:

determining, based at least in part on the hook that records the API call, that the file is attempting to execute a remote shell; and determining, based at least in part on the file's attempt to execute the remote shell, that the file is attempting to perform the enumeration attack.

11. The system of claim 9, wherein the analysis module determines that the file is attempting to perform the enumeration attack by:

determining, based at least in part on the hook that records the API call, that the file is attempting to bind a network port; and determining, based at least in part on the file's attempt to bind the network port, that the file is attempting to perform the enumeration attack.

12. The system of claim 9, further comprising a classifying module, stored in memory, that classifies the file as potentially malicious due at least in part to the file's attempt to perform the enumeration attack.

13. The system of claim 9, wherein the monitoring module monitors the file that is undergoing the malware analysis by directing the sandbox to execute the file in connection with the malware analysis.

14. The system of claim 9, wherein the monitoring module monitors the file that is undergoing the malware analysis by monitoring the file by one or more monitor components comprising at least one of:
- a user-mode hook;
- a kernel-mode hook;
- a packet capture component;
- a file system monitor; and
- a network switch.

15. The system of claim 9, wherein the analysis module further determines that the file is attempting to perform the enumeration attack by determining that the file is at least one of:
- attempting to determine whether the file is being subjected to a malware analysis in an sandbox;
- attempting to discover one or more resources of the sandbox;
- searching for files involved in performing the malware analysis;
- attempting to detect one or more monitor components that are monitoring the file during the malware analysis; and
- attempting to identify one or more computing devices in the sandbox.

16. A non-transitory computer-readable medium comprising one or more computer-readable instructions that, when executed by at least one processor of a computing device, cause the computing device to:
- monitor a file undergoing a malware analysis in a sandbox, the file being controlled and observed in the sandbox without exposing an underlying computing platform to certain risks associated with the file;
- while monitoring the file during the malware analysis, determine that the file is attempting to perform an enumeration attack, the enumeration attack being an attempt to discover proprietary information about a resource of the sandbox and exfiltrate the proprietary information to at least one of a person and a network location outside the sandbox, wherein determining that the file is attempting to perform the enumeration attack comprises:
  - detecting, via a hook that is internal to the sandbox and that records an Application Programming Interface (API) call initiated in connection with the file, one or more run-time behaviors exhibited by the file during the malware analysis that are indicative of an enumeration attack, the one or more run-time behaviors comprising searching, by the file, for one or more processes or components implemented by the sandbox during the malware analysis; and
  - determining, based at least in part on the file searching for the one or more processes or components, that the file is attempting to perform an enumeration attack on the sandbox; and
- in response to determining that the file is attempting to perform the enumeration attack, terminate the malware analysis.

* * * * *